US012325427B2

(12) United States Patent
Kim et al.

(10) Patent No.: US 12,325,427 B2
(45) Date of Patent: Jun. 10, 2025

(54) CONTROL SYSTEM FOR CONSTRUCTION MACHINE AND CONTROL METHOD FOR CONSTRUCTION MACHINE

(71) Applicant: HD HYUNDAI INFRACORE CO., LTD., Incheon (KR)

(72) Inventors: Jihoon Kim, Seoul (KR); Hongjin Kim, Bucheon-si (KR); Wooseok Seo, Bucheon-si (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 242 days.

(21) Appl. No.: 17/799,671

(22) PCT Filed: Feb. 10, 2021

(86) PCT No.: PCT/KR2021/001854
§ 371 (c)(1),
(2) Date: Aug. 13, 2022

(87) PCT Pub. No.: WO2021/162492
PCT Pub. Date: Aug. 19, 2021

(65) Prior Publication Data
US 2023/0082533 A1   Mar. 16, 2023

(30) Foreign Application Priority Data
Feb. 14, 2020   (KR) .................. 10-2020-0018382

(51) Int. Cl.
*B60W 40/076*   (2012.01)
*B60R 25/01*   (2013.01)
(Continued)

(52) U.S. Cl.
CPC .......... *B60W 40/076* (2013.01); *B60R 25/01* (2013.01); *B60R 25/10* (2013.01); *B60R 25/24* (2013.01);
(Continued)

(58) Field of Classification Search
CPC ...... B60W 40/076; B60R 25/01; B60R 25/10; B60R 25/24; B60R 25/34; E05B 81/02; E05B 81/54; E05B 83/42
See application file for complete search history.

(56) References Cited

U.S. PATENT DOCUMENTS 8,838,325 B2 *   9/2014   Tomik ................... B60K 28/12
                                                         701/30.8
9,812,997 B2 *  11/2017   Kojima .................... H02P 3/14
(Continued)

FOREIGN PATENT DOCUMENTS

DE   102016207961 A1 *  11/2017  ............ E05F 15/611
JP   3131303 B2 *   1/2001
(Continued)

OTHER PUBLICATIONS

"Schmitz, S; Kruppa, J; Crowhurst, P; Safety and Security Considerations of New Closure Systems; 2000; SAE Transactions, 2000, vol. 109, Section 6: Journal of Passenger Cars:Mechanical Systems Journal; 1757-1768" (Year: 2000).*
(Continued)

*Primary Examiner* — Peter D Nolan
*Assistant Examiner* — Christopher R Cardimino
(74) *Attorney, Agent, or Firm* — K&L Gates LLP

(57) ABSTRACT

A control system for a construction machine includes a tilt sensor for detecting an inclination angle of the construction machine parked on a slope, a door latch device including a lock/unlock actuator configured to lock/unlock a door of the construction machine according to a door lock control signal and a door unlock control signal and a release actuator configured to release the door according to a door release control signal, and a smart key module configured to output the door unlock control signal and the door release control signal when the inclination angle of the construction machine is within a preset safe range in case that an (Continued)

unlocking event signal is detected while a smart key is recognized.

10 Claims, 4 Drawing Sheets

(51) Int. Cl.
  *B60R 25/10*     (2013.01)
  *B60R 25/24*     (2013.01)
  *B60R 25/34*     (2013.01)
  *E02F 9/20*      (2006.01)
  *E05B 81/02*     (2014.01)
  *E05B 81/54*     (2014.01)
  *E05B 83/42*     (2014.01)

(52) U.S. Cl.
  CPC ............. *B60R 25/34* (2013.01); *E02F 9/20* (2013.01); *E05B 81/02* (2013.01); *E05B 81/54* (2013.01); *E05B 83/42* (2013.01); *B60Y 2200/41* (2013.01)

(56) References Cited

U.S. PATENT DOCUMENTS

| | | | | |
|---|---|---|---|---|
| 10,435,920 | B2 * | 10/2019 | Ganeshan | B60Q 9/008 |
| 11,951,815 | B2 * | 4/2024 | Kato | E02F 9/16 |
| 2006/0158319 | A1 * | 7/2006 | Kim | G07C 9/00182 713/1 |
| 2019/0180545 | A1 * | 6/2019 | Tsujimura | G06Q 10/0832 |
| 2022/0268080 | A1 * | 8/2022 | Sturm | E05F 15/611 |

FOREIGN PATENT DOCUMENTS

| | | | | |
|---|---|---|---|---|
| JP | 2003206675 | A | * | 7/2003 |
| JP | 2010077714 | A | * | 4/2010 |
| JP | 2013174046 | A | * | 9/2013 |
| JP | 2015086533 | A | | 5/2015 |
| JP | 2017197912 | A | * | 11/2017 |
| KR | 20110139621 | A | | 12/2011 |
| KR | 101399220 | B1 | | 6/2014 |
| KR | 20160073576 | A | | 6/2016 |
| KR | 20190075293 | A | | 7/2019 |

OTHER PUBLICATIONS

International Search Report for related International Application No. PCT/KR2021/001854; report dated Aug. 19, 2021; (7 pages).
Written Opinion for related International Application No. PCT/KR2021/001854; report dated Aug. 19, 2021; (4 pages).

* cited by examiner

CONTROL SYSTEM FOR CONSTRUCTION MACHINE AND CONTROL METHOD FOR CONSTRUCTION MACHINE

CROSS-REFERENCE TO RELATED APPLICATIONS

The present application is a National Stage of International Application No. PCT/KR2021/001854 filed on Feb. 10, 2021, which claims the benefit of Korean Patent Application No. 10-2020-0018382, filed on Feb. 14, 2020, the entire contents of which is hereby incorporated by reference.

FIELD

The present disclosure relates to a control system for a construction machine and a control method for a construction machinery. More particularly, the present disclosure relates to a control system for a construction machine having a smart door device and a control method for a construction machine using the same.

BACKGROUND

In a construction machine such as a wheel loader, a smart key system may be provided, so that an operational function such as vehicle door unlock, vehicle door lock, engine ignition, etc. may be performed while a user holds a smart key. However, in case that the wheel loader is parked on a slope to be tilted toward the driver, when the door is released according to an unlocking event signal, the cabin door may be opened by a rubber stream tension of the door and there is a risk of hitting the driver.

SUMMARY

An object of the present disclosure provides a control system for a construction machine having a smart key system that can safely open a door without being affected by the external environment.

Another object of the present disclosure provides a control method for a construction machine using the above control system.

According to example embodiments, a control system for a construction machine includes a tilt sensor for detecting an inclination angle of the construction machine parked on a slope, a door latch device including a lock/unlock actuator configured to lock/unlock a door of the construction machine according to a door lock control signal and a door unlock control signal and a release actuator configured to release the door according to a door release control signal, and a smart key module configured to output the door unlock control signal and the door release control signal when the inclination angle of the construction machine is within a preset safe range in case that an unlocking event signal is detected while a smart key is recognized.

In example embodiments, the control system for the construction machine may further include an unlocking switch installed at a position lower than the door and configured to generate the unlocking event signal.

In example embodiments, the smart key module may include at least one LF antenna installed in a cabin of the construction machine to receive a response signal from the smart key.

In example embodiments, the smart key module may output the door unlock control signal to the lock/unlock actuator when the inclination angle of the construction machine is out of the preset safety range.

In example embodiments, the smart key module may output the door lock control signal to the door latch device if the door is not released within a preset time after the smart key module outputs the door unlock control signal.

In example embodiments, the smart key module may output an ACC signal for entering an ACC mode when the door is in a released state.

In example embodiments, the smart key module may output a KEY OFF signal for turning off power when it is detected that the smart key is not recognized as being in the cabin within a preset time after entering the ACC mode.

According to example embodiments, in a control method for a construction machine, an inclination angle of the construction machine parked on a slope is detected. An unlocking event signal is detected in a state in which a smart key is recognized. A door is unlocked and released according to the unlocking event signal when the inclination angle is within a preset safety range.

In example embodiments, detecting the unlocking event signal may include detecting the unlocking event signal from an unlocking switch installed at a position lower than the door.

In example embodiments, unlocking the door may include operating a lock/unlock actuator of a door latch device of the construction machine, and releasing the door includes operating a release actuator of the door latch device.

In example embodiments, the control method may include unlocking the door according to the unlocking event signal when the inclination angle of the construction machine is out of the preset safety range.

In example embodiments, the control method may further include detecting whether or not the door is in a released state within a preset time after unlocking the door, and locking the door when it is detected that the door is not in the released state.

In example embodiments, the control method may further include entering an ACC mode when the door is in the released state.

In example embodiments, the control method may further include detecting whether or not the smart key is present in the cabin within a preset time after entering the ACC mode, and turning off power when the smart key is not recognized as being in the cabin.

DISCLOSURE According to example embodiments, an inclination angle of a construction machine may be detected by a tilt sensor, and only when it is determined that the inclination angle is within a safe range for a driver to safely open a door even though the door is in a released state, a lock/unlock actuator and a release actuator may be operated according to a unlocking event signal to thereby unlock and release the door. When it is determined that the driver cannot safely open the door due to the inclination angle in a state in which the inclination angle is out of the safety range and the door is in the released state, only the lock/unlock actuator may be operated according to the unlocking event signal to thereby unlock the door.

Accordingly, the door at a relatively high position such as a wheel loader may be safely opened using a smart key system.

Further, in case that the unlocking event signal is detected, an ACC mode may be entered when the door is released, and the ACC mode may be continuously maintained only when it is detected that the smart key is present in the cabin. Accordingly, by entering the ACC mode in advance, the user may quickly perform an entertainment function.

However, the effect of the disclosure may not be limited thereto, and may be expanded without being deviated from the concept and the scope of the present disclosure.

DETAILED DESCRIPTION

Figure 1:
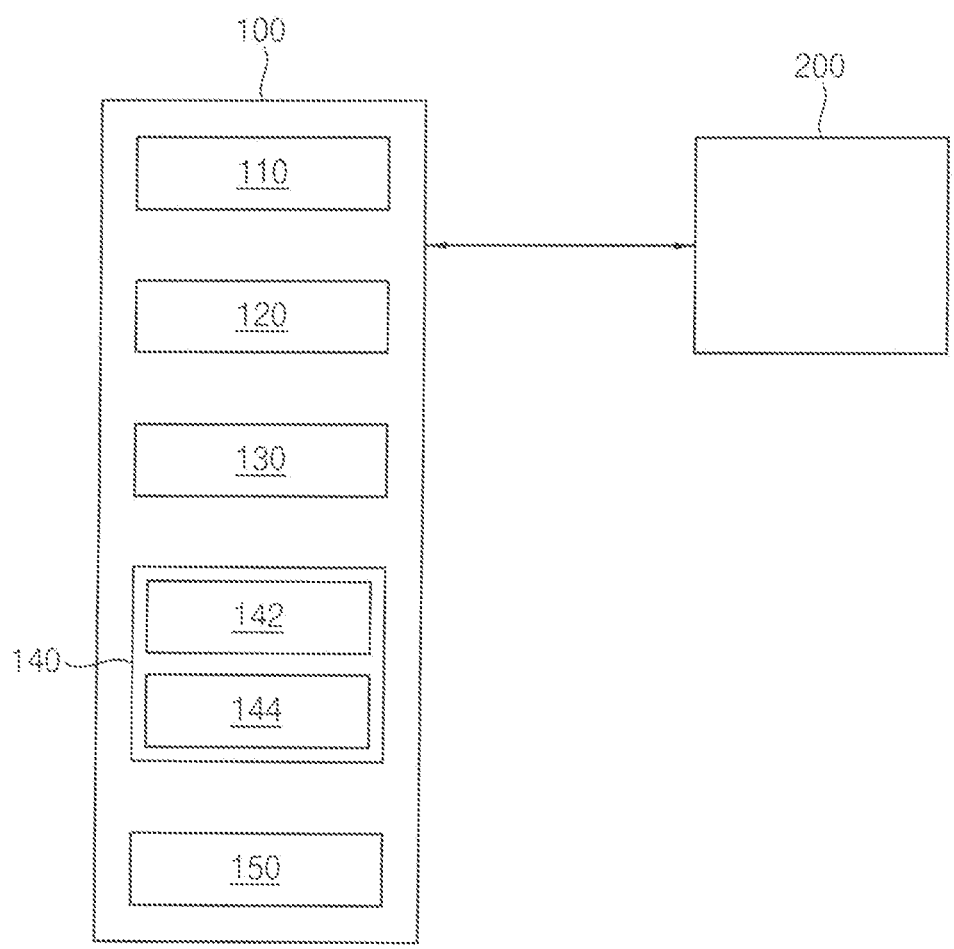
FIG. 1 is a 1 is a block diagram illustrating a control system for a construction machine in accordance with example embodiments.

Hereinafter, preferable embodiments of the present disclosure will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

Figure 2:
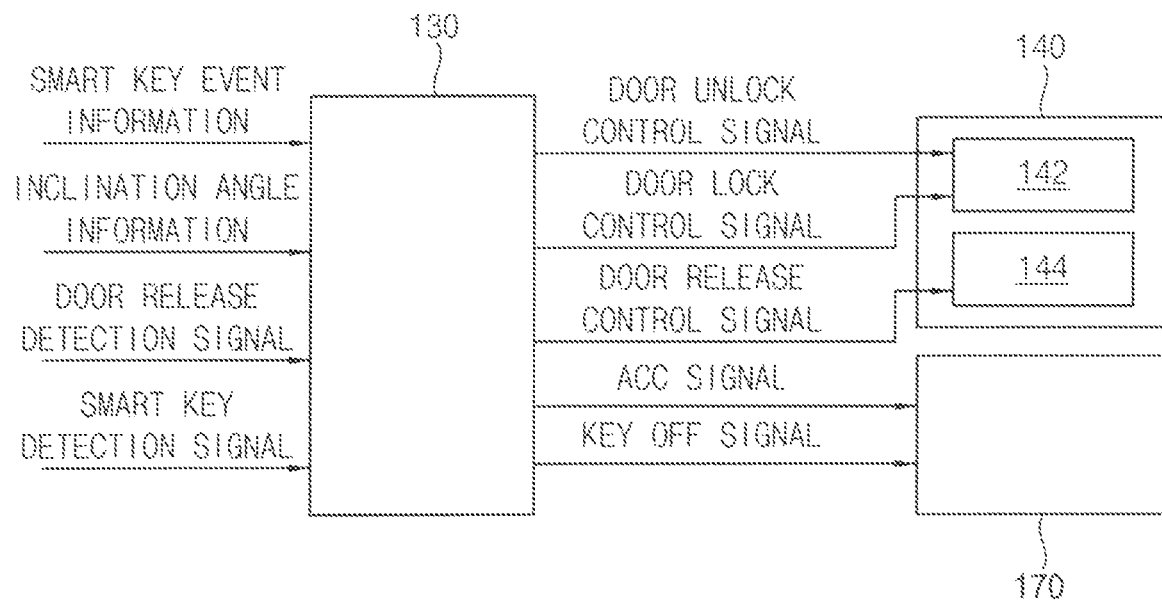
FIG. 2 is a block diagram illustrating a smart key module and a door latch device of the control system of the construction machine in FIG. 1.
Figure 3:
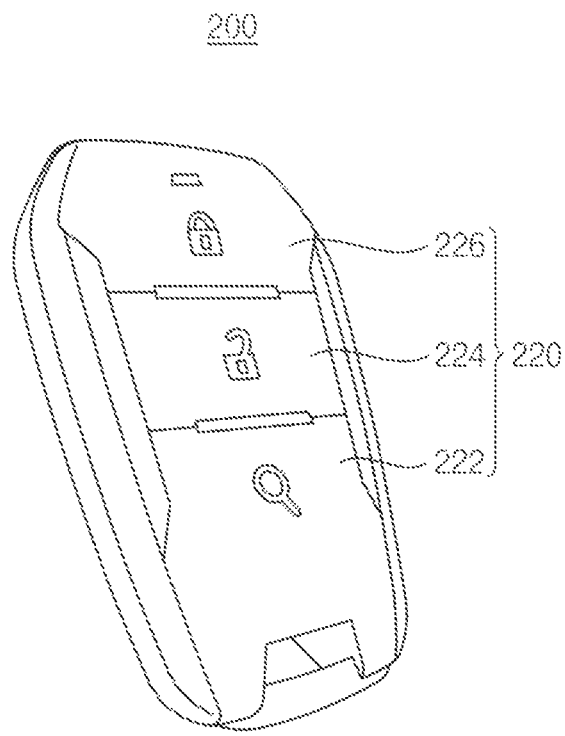
FIG. 3 is a perspective view illustrating a smart key of the control system of the construction machine in FIG. 1.
Figure 4:
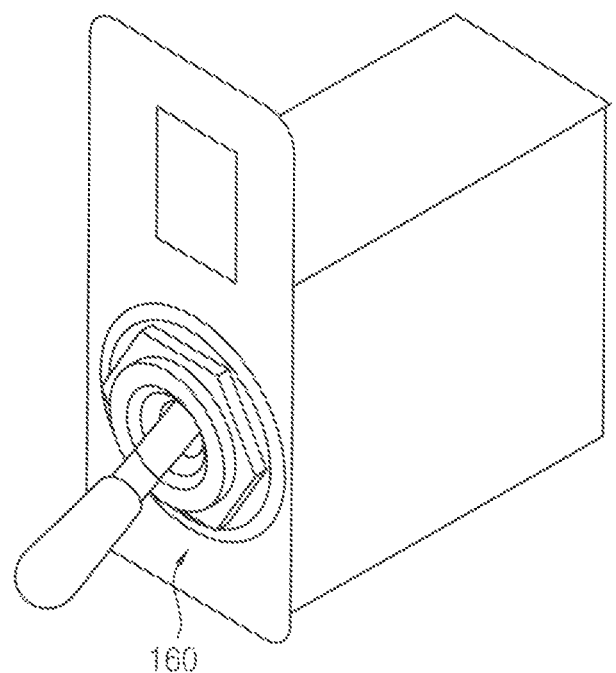
FIG. 4 is a perspective view illustrating an unlocking switch of the control system of the construction machine in FIG. 1.

FIG. 1 is a 1 is a block diagram illustrating a control system for a construction machine in accordance with example embodiments. FIG. 2 is a block diagram illustrating a smart key module and a door latch device of the control system of the construction machine in FIG. 1. FIG. 3 is a perspective view illustrating a smart key of the control system of the construction machine in FIG. 1. FIG. 4 is a perspective view illustrating an unlocking switch of the control system of the construction machine in FIG. 1.

Referring to FIGS. 1 to 4, a control system of a construction machine 10 may include a smart key (FOB) 200 configured to control a construction machine 100 and a smart key module 130 installed in the construction machine 100 to communicate wirelessly with the smart key 200.

In example embodiments, the construction machine may include an excavator, a wheel loader, a forklift, and the like. Hereinafter, it will be explained that example embodiments may be applied to the wheel loader. However, it may not be limited thereto, and it may be understood that example embodiments may be applied to other construction machine such as the wheel loader, the forklift, etc. The smart key module 130 may be installed in the construction machine, and may communicate with the smart key 200 to perform a smart key function.

The smart key 200 as a FOB key of a smart key system may perform low-frequency communication with the smart key module 130. When the smart key 200 receives a search signal from the smart key module 130, the smart key 200 may be configured to transmit a response signal in response to the search signal. For example, the search signal may be an LF (low frequency) signal (eg, 125 kHz), and the response signal may be a RF (radio frequency) signal (eg, 315 MHz, 433 MHz, etc.).

When the smart key module 130 receives a control signal for controlling the construction machine, the smart key module 130 may transmit the search signal for searching a smart key 200 near the smart key module 130 and may receive the response signal from the smart key 200.

As illustrated in FIG. 2, the construction machine 100 may include a GPS module 110, a remote management device 120, the smart key module 130, a door latch device 140, a tilt sensor 150, etc. The GPS module 110, the remote management device 120 and the smart key module 130 may communicate with each other using CAN (Controller Area Network) communication.

The GPS module 110 may include a global positioning system (GPS) receiver. The GPS module 110 may receive a signal transmitted from a GPS satellite and calculate a current location of the construction machine 100 to generate construction machine location information.

The remote management device 120 may perform wireless communication with an external device, for example, a remote control server (not illustrated) to remotely manage the construction machine 100. The remote management device 120 may transmit the construction machine location information to the remote control server. Additionally, the remote management device 120 may receive a remote control signal from the remote control server. For example, the remote management device 120 may include a TMS (Tele-Management System) module.

The smart key module 130 may receive the control signal such as a door unlocking event signal and perform an operation function corresponding to the received control signal.

In particular, when the smart key module 130 receive the control signal for controlling the construction machine, the smart key module 130 may transmit the search signal for searching the smart key 200 around the smart key module 130 and may receive the response signal from the smart key 200. The smart key module 130 may authenticate whether or not a registration authentication code included in the response signal matches with a pre-stored registration authentication code. When the response signal matches with the registration authentication number, the smart key module 130 may perform operation functions such as vehicle door unlock, vehicle door lock, engine ignition, etc. corresponding to the received door unlocking event signal.

The smart key module 130 may include a communication portion, a module controller and a module storage portion. The communication portion may include an LF antenna and an RF antenna for searching for the smart key 200 near the smart key module 130. The LF antenna may transmit the search signal (LF signal), and the RF antenna may receive the response signal (RF signal). For example, the communication portion may be installed in a cabin of the construction machine (inside and/or outside the cabin) and may include at least one LF antenna for receiving a response signal from the smart key 200. The module controller may execute a control program for the smart key operation. The module storage portion may include a program region for storing a control program for smart key operation and a temporary region for storing data generated during the execution of the control program.

The door latch device 140 may include a lock/unlock actuator 142 configured to lock/unlock a door of the construction machine according to a door lock control signal and a door unlock control signal and a release actuator 144 configured to release the door according to a door release control signal.

The tilt sensor 150 may detect an inclination angle of the construction machine 100 parked on a slope. The tilt sensor 150 may output inclination angle information of the construction machine 100 to the smart key module 130.

In example embodiments, the construction machine 100 may further include an unlocking switch 160 configured to generate the unlocking event signal. The unlocking switch 160 may be installed at a position lower than the door. A user may generate the unlocking event signal by operating the unlocking switch 160 installed next to a ladder under the door while the smart key 200 is recognized.

When the smart key module 130 detects the unlocking event signal while the smart key 200 is recognized as being around the door, the smart key module 130 may transmits the door unlock control signal and the door release control signal to the door latch device 140.

In particular, the smart key module 130 may output the door unlock control signal to the lock/unlock actuator 142 when the inclination angle of the construction machine is out of a preset safety range, and the smart key module 130 may output the door unlock control signal and the door release control signal to the lock/unlock actuator 142 and the release actuator 144 respectively when the inclination angle of the construction machine is within the preset safety range.

When the construction machine 100 is tilted toward a driver who is about to board, that is, when the inclination angle of the construction machine 100 is out of the safe range, if the door is released, the door may be opened by a rubber stream tension of the door and accordingly may hit the driver's face or head and inflict an impact.

When the inclination angle is out of the safe range, the smart key module 130 may output only the door unlock control signal to the lock/unlock actuator 142 according to the unlocking event signal to thereby unlock the door. Thus, in a state in which the door is not released, the driver may rotate a door lever to release the door and then open the door.

When the inclination angle is within the safety range, the smart key module 130 output the door unlock control signal and the door release control signal to the lock/unlock actuator 142 and the release actuator 144 respectively according to the unlocking event signal to thereby unlock and release the door. Thus, in a state in which the door is released, the driver may open the door by pulling the door lever.

As illustrated in FIG. 3, an input portion 220 of the smart key 200 may include a first operation selection button 224 for the vehicle door unlock and a second operation selection button 226 for the vehicle door lock.

In example embodiments, the construction machine 100 may further include a door switch for detecting whether or not the door is in the released state. The door switch may be installed under a hinge of the cabin, and may output a door release detection signal to the smart key module 130 when the door is in the released state.

When the inclination angle of the construction machine is out of the safe range, if the door is not released within a preset time (eg, 3 to 6 minutes) after the smart key module 130 outputs only the door unlock control signal, the smart key module 130 may output the door lock control signal to the lock/unlock actuator 142 of the door latch device 140. The lock/unlock actuator 142 may lock the door in response to the door lock control signal.

In addition, the smart key module 130 may output an ACC signal for entering an ACC mode to a power supply 170 when the door is in the released state. The power supply 170 may supply power for an accessory in response to the ACC signal.

In example embodiments, the smart key module 130 may receive a smart key detection signal for detecting whether or not the smart key 200 is present in the cabin within a preset time (eg, 2 minutes) after entering the ACC mode, and may output a KEY OFF signal for turning off the power to the power supply 170 when the smart key 200 is not recognized as being in the cabin. The power supply 170 may turn off the power in response to the KEY OFF signal.

Hereinafter, a method of controlling a construction machine using the control system for the construction machine in FIG. 1 will be explained.

Figure 5:
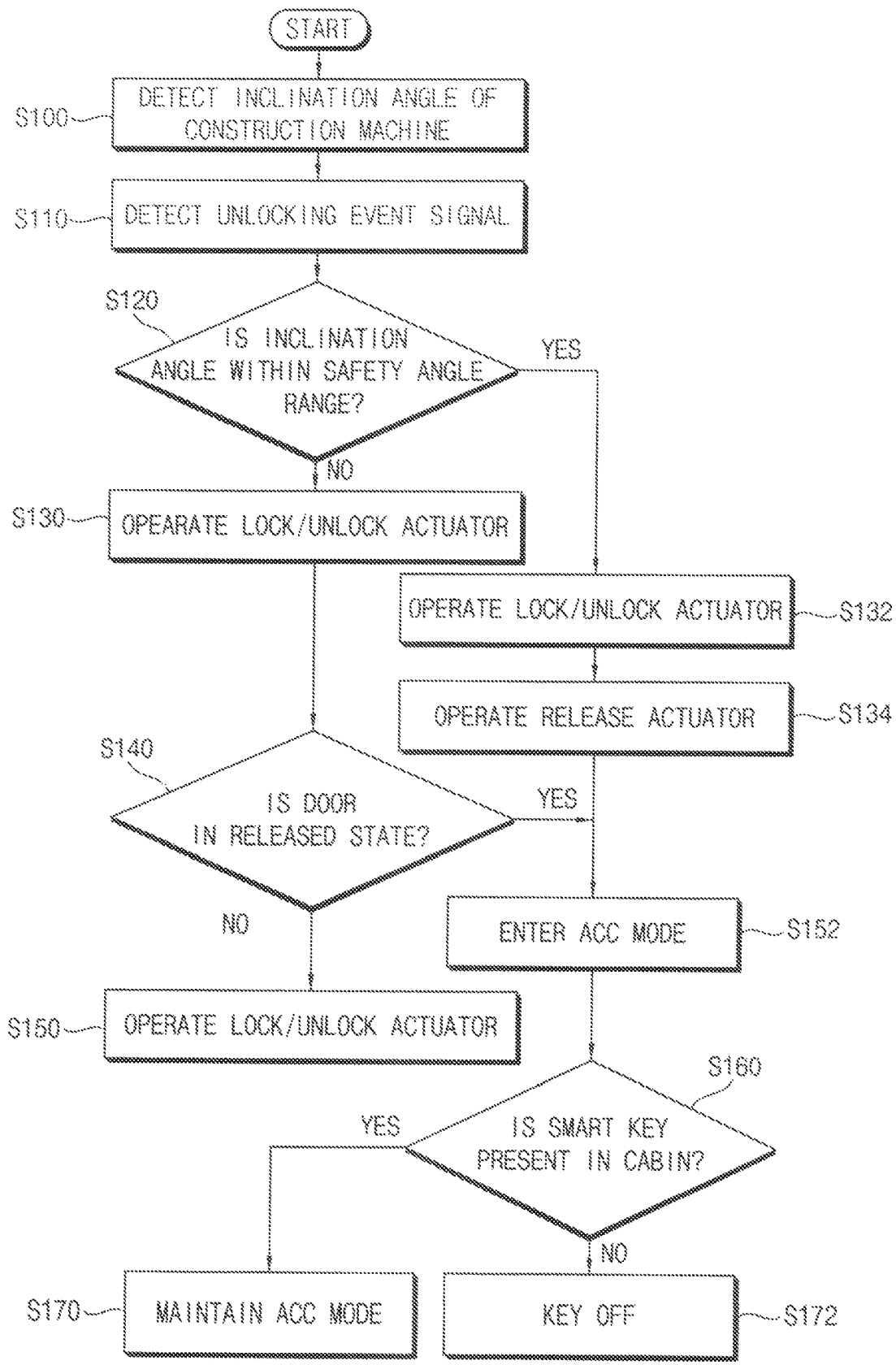
FIG. 5 is a flow chart illustrating a method of controlling a construction machine in accordance with example embodiments.

FIG. 5 is a flow chart illustrating a method of controlling a construction machine in accordance with example embodiments.

FIGS. 1 to 5, first, an inclination angle of a construction machine 100 parked on a slope may be detected (S100), and an unlocking event signal may be detected in a state in which a smart key 200 is recognized as being near a door of the construction machine (S110).

In example embodiments, the inclination angle information of the construction machine 100 may be obtained from a tilt sensor 150 installed in the construction machine 100. The tilt sensor 150 may output the inclination angle information of the construction machine 100 to a smart key module 130.

A user may generate the unlocking event signal by operating an unlocking switch 160 installed next to a ladder under the door in the state in which the smart key 200 is recognized.

Then, when the smart key module 130 detects the unlocking event signal, whether or not the inclination angle is within a preset safety range may be determined (S120). When the inclination angle is out of the preset safety range, the door of the construction machine may be unlocked according to the unlocking event signal (S130). When the inclination angle is within the preset safety range, the door may be unlocked and released according to the unlocking event signal (S132, S134).

In example embodiments, the smart key module 130 may output only a door unlock control signal to a lock/unlock actuator 142 according to the unlocking event signal when the inclination angle is out of the preset safe range, to thereby unlock the door. Thus, in a state in which the door is not released, a driver may rotate a door lever to release the door and then open the door.

The smart key module 130 may output the door unlock control signal and a door release control signal to the lock/unlock actuator 142 and a release actuator 144 according to the unlocking event signal when the inclination angle is within the preset safety range, to thereby unlock and release the door. Thus, in a state in which the door is released, the driver may open the door by pulling the door lever.

Then, it may be detected whether or not the door is in the released state within a preset time after unlocking the door, (S140), and when it is detected that the door is not in the released state, the door may be locked (S150).

In example embodiments, the construction machine 100 may further include a door switch for detecting whether the door is in a released state. The door switch may be installed under a hinge of the cabin, and may output a door release detection signal to the smart key module 130 when the door is in the released state.

When the inclination angle of the construction machine is out of the safe range, if the door is not released within a preset time (eg, 3 to 6 minutes) after the smart key module 130 outputs only the door unlock control signal, the smart key module 130 may output a door lock control signal to the lock/unlock actuator 142 of the door latch device 140. The lock/unlock actuator 142 may lock the door in response to the door lock control signal.

When the door is in the released state, an ACC mode may be entered (S152). It may be detected whether or not the smart key is present in the cabin within a preset time after entering the ACC mode (S160), and when the smart key is not recognized as being in the cabin, power may be turned off (S170). When the smart key is recognized as being in the cabin, the ACC mode may be maintained (S172).

In example embodiments, the smart key module 130 may output an ACC signal for entering the ACC mode to a power supply 170 when the door is in the released state. The power supply 170 may supply power for an accessory in response to the ACC signal.

In example embodiments, the smart key module 130 may receive a smart key detection signal for detecting whether or not the smart key 200 is present in the cabin within the preset time (eg, 2 minutes) after entering the ACC mode, and may output a KEY OFF signal for turning off the power to the power supply 170 when the smart key 200 is not recognized as being in the cabin. The power supply 170 may turn off the power in response to the KEY OFF signal.

As described above, the inclination angle of the construction machine 100 may be detected by the tilt sensor 150, and only when it is determined that the inclination angle is within the safe range for the driver to safely open the door even though the door is in the released state, the lock/unlock actuator 142 and the release actuator 144 may be operated according to the unlocking event signal to thereby unlock and release the door. When it is determined that the driver cannot safely open the door due to the inclination angle in a state in which the inclination angle is out of the safety range and the door is released, only the lock/unlock actuator 142 may be operated according to the unlocking event signal to thereby unlock the door.

Accordingly, the door at a relatively high position such as a wheel loader may be safely opened using the smart key system.

Further, in case that the unlocking event signal is detected, the ACC mode may be entered when the door is released, and the ACC mode may be continuously maintained only when it is detected that the smart key is present in the cabin. Accordingly, by entering the ACC mode in advance, the user may quickly perform an entertainment function.

The present disclosure has been explained with reference to preferable embodiments, however, those skilled in the art may understand that the present disclosure may be modified or changed without being deviated from the concept and the scope of the present disclosure disclosed in the following claims.

| <The description of the reference numerals> | |
|---|---|
| 10: control system for a construction machine | 100: construction machine |
| 110: GPS module | 120: remote management device |
| 130: smart key module | 140: door latch device |
| 142: lock/unlock actuator | 144: release actuator |
| 150: tilt sensor | 160: unlocking switch |
| 170: power supply | 200: smart key |

The invention claimed is:

1. A control system for a construction machine, comprising:
   a tilt sensor for detecting an inclination angle of the construction machine parked on a slope;
   a door latch device including a lock/unlock actuator configured to lock/unlock a door of the construction machine according to a door lock control signal and a door unlock control signal, and a release actuator configured to release the door according to a door release control signal; and
   a smart key module configured to output the door unlock control signal and the door release control signal when the inclination angle of the construction machine is within a preset safe range when an unlocking event signal is detected while a smart key is recognized, wherein the lock/unlock actuator unlocks the door of the construction machine and the release actuator releases the door of the construction machine and wherein the door is configured to open in response to a driver of the construction machine pulling a door lever of the door; and
   a door switch installed under a hinge of a cabin of the construction machine, the door switch configured to output a door release detection signal to the smart key module when the door is in the released state,
   wherein the smart key module outputs the door unlock control signal to the lock/unlock actuator and the lock/unlock actuator unlocks the door of the construction machine when the inclination angle of the construction machine is out of the preset safety range and an unlocking event signal is detected while a smart key is recognized and wherein the door is configured to release in response to the driver of the construction machine rotating the door lever and to open in response to the driver of the construction machine pulling the door lever, wherein the unlocking event signal is generated by the driver of the construction machine operating an unlocking switch, wherein the unlocking switch generates the unlocking event signal, and wherein the unlocking switch is installed at a position lower than the door, and wherein the smart key module outputs an ACC signal for entering an ACC mode to a power supply when the smart key module receives the door release detection signal.

2. The control system for the construction machine of claim 1, wherein the smart key module includes at least one LF antenna installed in a cabin of the construction machine to receive a response signal from the smart key.

3. The control system for the construction machine of claim 1, wherein the smart key module outputs the door lock control signal to the door latch device if the door is not released within a preset time after the smart key module outputs the door unlock control signal.

4. The control system for the construction machine of claim 1, wherein the smart key module outputs an ACC signal for entering an ACC mode when the door is in a released state.

5. The control system for the construction machine of claim 4, wherein the smart key module outputs a KEY OFF signal for turning off power when it is detected that the smart key is not recognized as being in the cabin within a preset time after entering the ACC mode.

6. A control method for a construction machine, comprising:
   detecting an inclination angle of the construction machine parked on a slope;
   detecting an unlocking event signal in a state in which a smart key is recognized;
   unlocking and releasing a door according to the unlocking event signal when the inclination angle is within a preset safety range, wherein the door is configured to open in response to a driver of the construction machine pulling a door lever of the door;
   unlocking the door according to the unlocking event signal when the inclination angle of the construction machine is out of the preset safety range, wherein the door is configured to release in response to the driver of the construction machine rotating the door lever and to open in response to the driver of the construction machine pulling the door lever; and
   outputting a door release detection signal to the smart key module by a door switch installed under a hinge of a cabin of the construction machine,
   wherein the unlocking event signal is generated by the driver of the construction machine operating an unlocking switch, wherein the unlocking switch generates the unlocking event signal, and wherein the unlocking switch is installed at a position lower than the door, and
   wherein the smart key module outputs an ACC signal for entering an ACC mode to a power supply when the smart key module receives the door release detection signal.

7. The control method of claim 6, wherein unlocking the door includes operating a lock/unlock actuator of a door latch device of the construction machine, and
   releasing the door includes operating a release actuator of the door latch device.

8. The control method of claim 6, further comprising:
   detecting whether or not the door is in a released state within a preset time after unlocking the door; and
   locking the door when it is detected that the door is not present in the released state.

9. The control method of claim 6, further comprising:
   entering an ACC mode when the door is in the released state.

10. The control method of claim 9, further comprising:
   detecting whether or not the smart key is present in the cabin within a preset time after entering the ACC mode; and
   turning off power when the smart key is not recognized as being in the cabin.

* * * * *